United States Patent
Khsib

(10) Patent No.: US 10,448,009 B1
(45) Date of Patent: Oct. 15, 2019

(54) DETERMINING SAMPLE ADAPTIVE OFFSET FILTER PARAMETERS

(71) Applicant: Amazon Technologies, Inc., Seattle, WA (US)

(72) Inventor: Ramzi Khsib, Coquitlam (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/841,962

(22) Filed: Dec. 14, 2017

(51) Int. Cl.
 *H04N 19/103* (2014.01)
 *H04N 19/82* (2014.01)
 *H04N 19/196* (2014.01)
 *H04N 19/124* (2014.01)
 *H04N 19/176* (2014.01)
 *H04N 19/117* (2014.01)

(52) U.S. Cl.
 CPC ......... *H04N 19/103* (2014.11); *H04N 19/117* (2014.11); *H04N 19/124* (2014.11); *H04N 19/176* (2014.11); *H04N 19/196* (2014.11); *H04N 19/82* (2014.11)

(58) Field of Classification Search
 CPC combination set(s) only.
 See application file for complete search history.

(56) References Cited

U.S. PATENT DOCUMENTS

| 2004/0006644 | A1* | 1/2004 | Henocq | H04N 21/2402 709/246 |
| 2014/0112396 | A1* | 4/2014 | Ikeda | H04N 19/117 375/240.29 |
| 2014/0192869 | A1* | 7/2014 | Laroche | H04N 19/176 375/240.12 |

\* cited by examiner

*Primary Examiner* — Tracy Y. Li
(74) *Attorney, Agent, or Firm* — Knobbe, Martens, Olson & Bear, LLP

(57) ABSTRACT

A content streaming system and methodology facilitates the selection of sample adaptive offset filter parameters for use in a sample adaptive filter in encoding content for content streaming. Selection of the sample adaptive offset filter parameters can include multiple active parameter selection modes responsive to block-based statistics. Multiple active parameter selection modes provide increased granularity in the encoded content.

20 Claims, 6 Drawing Sheets

DETERMINING SAMPLE ADAPTIVE OFFSET FILTER PARAMETERS

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers generally provide requested content to client computing devices often with consideration of image quality of the requested content as reconstructed at the client computing device. Artifacts resulting from the encoding process can lead to degradation of content image when it is reconstructed at the client computing device.

Some content providers attempt to facilitate the delivery of requested content through the utilization of a content delivery network ("CDN") service provider. As with content providers, CDN service providers also provide requested content to client computing devices often with consideration of image quality of the requested content to the client computing device. Accordingly, CDN service providers often consider image quality or the quality of delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
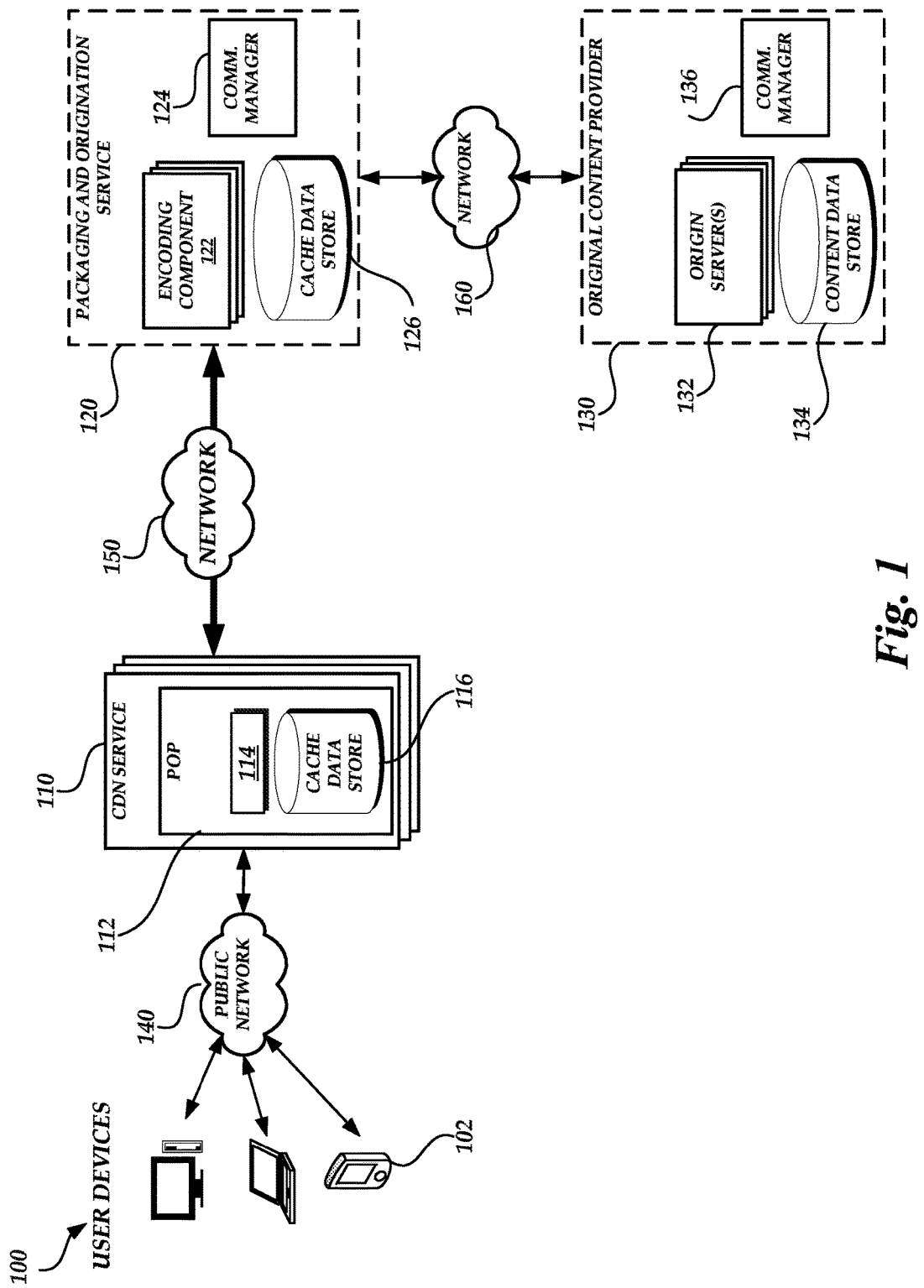
FIG. 1 is a block diagram of a content delivery environment that includes one or more client devices, one or more edge locations, and a video packaging system in accordance with some embodiments.

Generally described, content providers can provide content to requesting users. With regard to video content, a content provider can implement a video packaging and origination service that is able to deliver video content to requesting users. Still further, the content provider or packaging and origination service can utilize a CDN or other content delivery component to deliver video content to requesting users or client computing devices utilizing streaming transmissions in accordance with one of a range of communication protocols, such as the hypertext transfer protocol ("HTTP").

Content providers can organize requested content, such as a video file, into multiple segments that are then transmitted to requesting devices segment by segment. For example, in a video stream, each segmented portion typically accounts for 2-10 seconds of video rendered on a receiving device, although other temporal ranges are contemplated herein, as appropriate for functionality.

Each video segment can be encoded according to an encoding format utilized by the encoder to generate the output stream. The encoding format can correspond to a content representation format for storage or transmission of video content (such as in a data file or bitstream). Examples of encoding formats include but are not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

With regard to the HEVC encoding format, HEVC can be generally described as a block-based hybrid spatial and temporal predictive coding scheme. HEVC can have an interprediction coding block to generate interprediction signals. The difference between the original block and its prediction is the residual and it can be transformed by a linear special transformation. The transform coefficients can be scaled, quantized, entropy coded, and transmitted together with the prediction information. The HEVC encoder can duplicate the decoder processing loop. The decoded residual from the decoder processing loop can be added to the interprediction signals and the result can be filtered to smooth out the artifacts introduced by block-wise processing and quantization. HEVC can have filtering stages referred to as de-deblocking filters and sample adaptive offset ("SAO") filters. The SAO filter can be implemented in the decoder processing loop of the encoder and can provide an improvement in video quality of the decoded picture. More specifically, the SAO is generally considered to improve video quality by filtering out information that causes the artifacts introduced by the block-wise processing and quantization. For example, the SAO filter can attenuate ringing artifacts and changes in sample intensity in some areas of the picture.

In an HEVC encoder, the SAO filter can be employed after the de-blocking filter in a prediction loop. SAO filtering can modify decoded samples of the encoded video by conditionally adding an offset to each block. SAO filtering can allow additional refinement of the reconstructed signal by enhancing the signal representation in smooth areas and around edges.

HEVC can have many stages including a filtering stage. The filtering stage can include SAO filtering. SAO filtering has the general purpose of smoothing out the artifacts introduced by block-wise processing and quantization. HEVC can use two types of SAO filters: edge offset ("EO") and band offset ("BO"). Each filter type can affect how the pixels are reconstructed at the decoder. The EO filter type involves the current pixel in common with two neighboring pixels, while the BO filter type involves the current pixel. Each filter type can have four directional classifiers: 0, 45, 90, and 135 degrees, which are indicated as offsets according to a selected direction. The SAO filter operation can be specified by the SAO filter parameters. The SAO filter parameters can indicate whether the SAO filter is enabled, the SAO filter type, and the four offsets for each sample. The encoder can add the SAO parameters to the encoded sample bitstream to be used by the decoder at the user device when reconstructing the video.

In certain embodiments, SAO filter parameters can be selected to minimize the average sample-rate distortion. For example, the encoder can calculate block-based statistics and then apply a rate distortion optimization ("RDO") process to find the optimum SAO filter parameters for the block. The RDO process can take into account the deviation of the encoded sample from the original source sample and the bit cost to implement a certain quality level. Block-based statistics can be the sum of pixel-wise differences between deblocking-filtered samples and original source samples for each SAO filter type and associated directional classifiers. Block-based statistics can also be the number of samples belonging to each combination of the SAO filter type and the directional classifier. The reconstruction of the blocks can follow to produce the final output samples by applying the RDO process results to the post-deblocking samples.

In some embodiments, selecting the SAO filter parameters to minimize the average sample-rate distortion can reduce perceived edge contrast of a surface with a smooth, highly regularized texture. For example, SAO filter parameter selection that relies on optimizing the error between the reconstructed signal and the original signal can diminish the perceived quality of the reconstructed signal. Further, SAO filter parameter selection that selects between two active modes, such as between using the EO filter type and using the BO filter type, can lack sufficient granularity to optimize the SAO filter parameters to improve video quality. Because of this potential, traditional implementation of SAO filtering does not allow selecting when aspects of the encoded content may be affected.

Aspects of the present application correspond to a content streaming system and methodology for selecting SAO filter parameters to improve perceived image quality. Instead of relying on minimizing a measure of distortion, the SAO filter parameters can be selected to utilize the intrinsic ability of the SAO filter (e.g., to reduce ringing artifacts), to avoid the shortcomings (e.g., unwanted softness), disable the filter when it is deemed to introduce undesirable artifacts, and improve the selection of filter parameters in the nominal range. The selection of the SAO filter parameters can be responsive to a characteristic of the sample, such as the quantization parameter of the sample. For example, the selection of the SAO filter parameters can be responsive to an average quantization parameter of the frame. The video content can be transformed into the spatial frequency domain by an integer transform. The quantization parameter can determine the step size for associating the transformed coefficients with a finite set of steps. The quantization parameter can be a unitless index used to derive a scaling matrix. The quantization parameter can indicate how much spatial detail is saved in the encoded image. When the quantization parameter is small, most of the detail is retained. Small values of the quantization parameter can more accurately approximate the samples spatial frequency spectrum, but at the cost of more bits. As the quantization parameter increases, the aggregation of the detail correspondingly increases, which can result in a decrease in the bitrate as well as a loss of video quality. Large values of the quantization parameter can represent big steps that can crudely approximate the spatial transform, so that most of the signal can be captured by a few coefficients. Selecting SAO filter parameters in response to the quantization parameter of the frame can provide increased video quality.

In accordance with aspects of the present application, the SAO filter parameter selection can include more than two active adaptive filter operational modes for finer granularity to provide improved image quality. Generally described, an active adaptive filter operational mode can be any mode with some form of SAO filtering enabled. An inactive adaptive filter operational mode can be any mode with the SAO filter disabled. Illustratively, an encoder can select from a plurality of active modes responsive to the average quantization parameter per frame information as input.

In accordance with aspects of the present application, the SAO filter parameter selection can include an adaptive filter operating mode corresponding to full adaptive filtering. In accordance with aspects of the present application, the SAO filter parameter selection can include an adaptive filter operating mode corresponding to partial adaptive filtering. Generally described, a full adaptive filtering mode can be any mode with SAO filter parameters that include both EO filter parameters and BO filter parameters. In accordance with aspects of the present application, the SAO filter parameter selection can include an adaptive filter operating mode corresponding to partial adaptive filtering. Generally described, a full adaptive filtering mode can be any mode that enables the SAO filter and the SAO filter parameters include less than both EO filter parameters and BO filter parameters.

In some embodiments, the encoder the active modes can include a banding artifacts reduction mode, a ringing artifacts reduction mode, a block adaptive mode, and a mode that uses the RDO process to minimize distortion (a default mode). In certain aspects, the banding artifacts reduction mode can generate SAO filter parameters that can reduce the perceived banding artifacts for higher bitdepth video and in the presence of gradient regions, such as a displayed sunset, for example. In certain aspects, the ringing artifacts reduction mode can generate SAO filter parameters that can reduce the ringing artifacts when the density of pixels indicates an edge. In certain aspects, the block adaptive mode can generate SAO filter parameters that can preserve the overall texture and sharpness of the picture by enabling both EO and BO filter types and determining which to select based on a sharpness measure of the reconstructed pixel. In certain aspects, the default mode can generate SAO filter parameters that can minimize the average sample-rate distortion.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a video packaging and origination service 120 can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

Client computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g. a thermostat or refrigerator), controller, digital media player, watch, eyewear, a home or car device, or any internet-of-things device, virtual or augmented reality computing device, and the like. Each client computing device 102 may optionally include one or more data stores (not shown in FIG. 1) including various applications or computer-executable instructions, such as web browsers, used to implement the embodiments disclosed herein. Illustrative components of a client computing device 102 will be described with regard to FIG. 2.

In some embodiments, a CDN service provider 110 may include multiple edge locations from which a user device can retrieve content. Individual edge location may be referred to herein as a point of presence 112 ("POP"), where a POP is intended to refer to any collection of related computing devices utilized to implement functionality on behalf of one or many providers. POPs 112 are generally associated with a specific geographic location in which the computing devices implementing the POP are located, or with a region serviced by the POP. As illustrated in FIG. 1, the POP 112 can include one or more information processing components 114 for processing information provided by client computing devices 102 and for managing content provided by the video packaging and origination service 120. The POP 112 can further include a data store 116 for maintaining collected information. For example, a data center or a collection of computing devices within a data center may form a POP. In some instances, the POPs 112 may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network ("GAN"), such as the Internet. Protocols and components for communicating via the other aforementioned types of communication networks are well known to those skilled in the art of computer communications and thus, need not be described in more detail herein. While each of the client computing devices 102 and CDN service provider 110 are depicted as having a single connection to the network 140, individual components of the client computing devices 102 and CDN service provider 110 may be connected to the network 140 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 120 may utilize any number or combination of networks.

The original content providers 130 may include one or more servers origin 132 for delivering content, a content data store 134 for maintaining content and a communication manager 136 for facilitating communications to the video packaging and origination service 120 over network 160.

In accordance with embodiments, the video packaging and origination service 120 includes one or more encoding components 122 for receiving content from original content providers 130 and processing the content to generate a set of encoded video segments available for delivery. The video packaging and origination service 120 can further include a data store 126 for maintaining collected information and a communication manager 124 to facilitate communications between the video packaging and origination service 120 and networks 150 and 160.

It will be appreciated by those skilled in the art that the video packaging and origination service 120 and information processing component 114 may have fewer or greater components than are illustrated in FIG. 1. Thus, the depiction of the video packaging and origination service 120 and the information processing component 114 in FIG. 1 should be taken as illustrative. For example, in some embodiments, components of the video packaging and origination service 120 and the processing component 114 may be executed by one more virtual machines implemented in a hosted computing environment. A hosted computing environment may include one or more rapidly provisioned and released computing resources, which computing resources may include computing, networking or storage devices.

Figure 2:
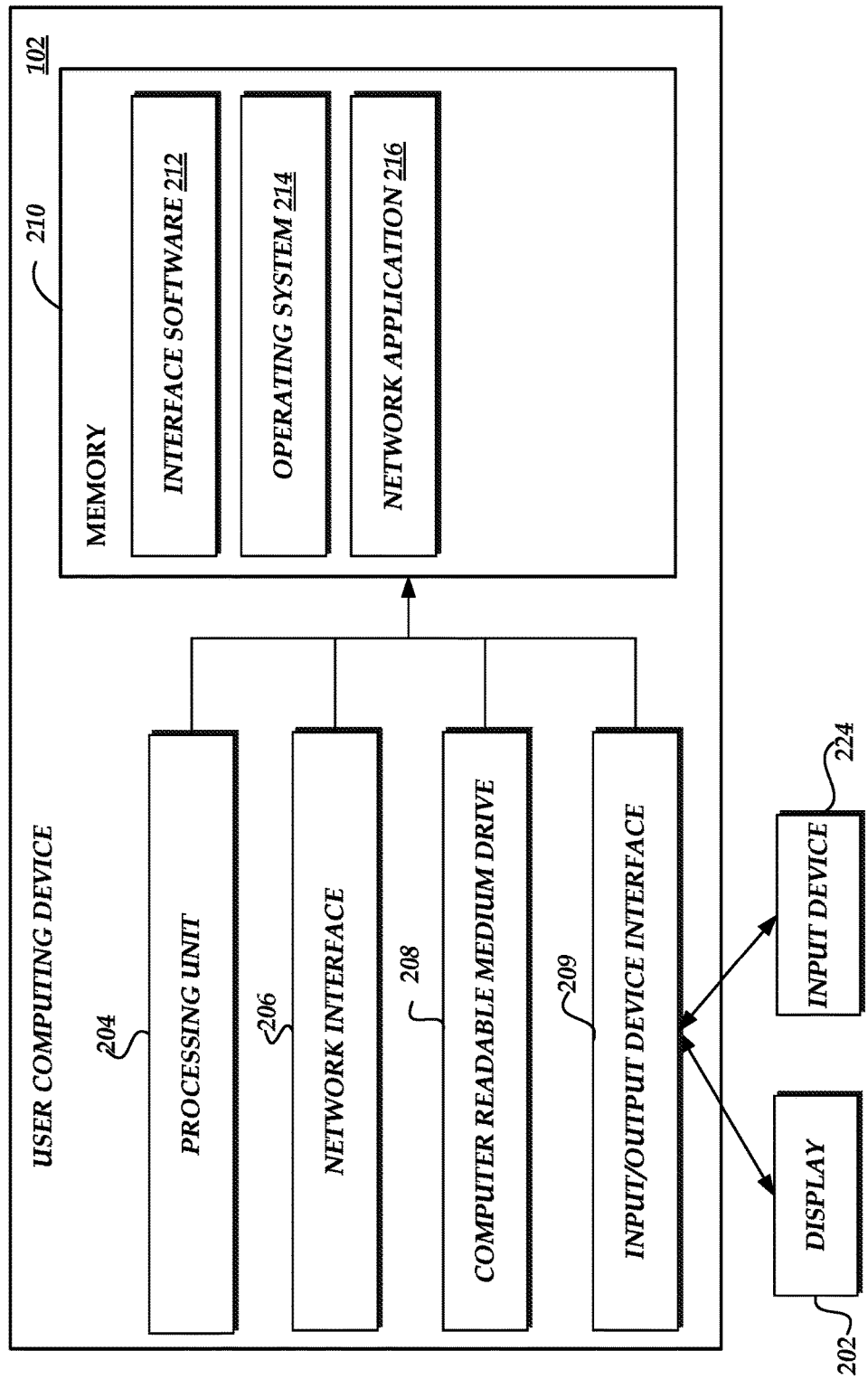
FIG. 2 is a block diagram of illustrative components of a client computing device configured to remotely process content in accordance with some embodiments.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 140 of FIG. 1 and the video packaging and origination service 120 or the original content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for requesting and receiving content from the video packaging and origination service 120 via the CDN service provider. For example, in one embodiment, the memory 210 includes a network application 216, such as browser application or media player, for accessing content, decoding the encoded content, and communicating with the CDN service provider 110.

Figure 3:
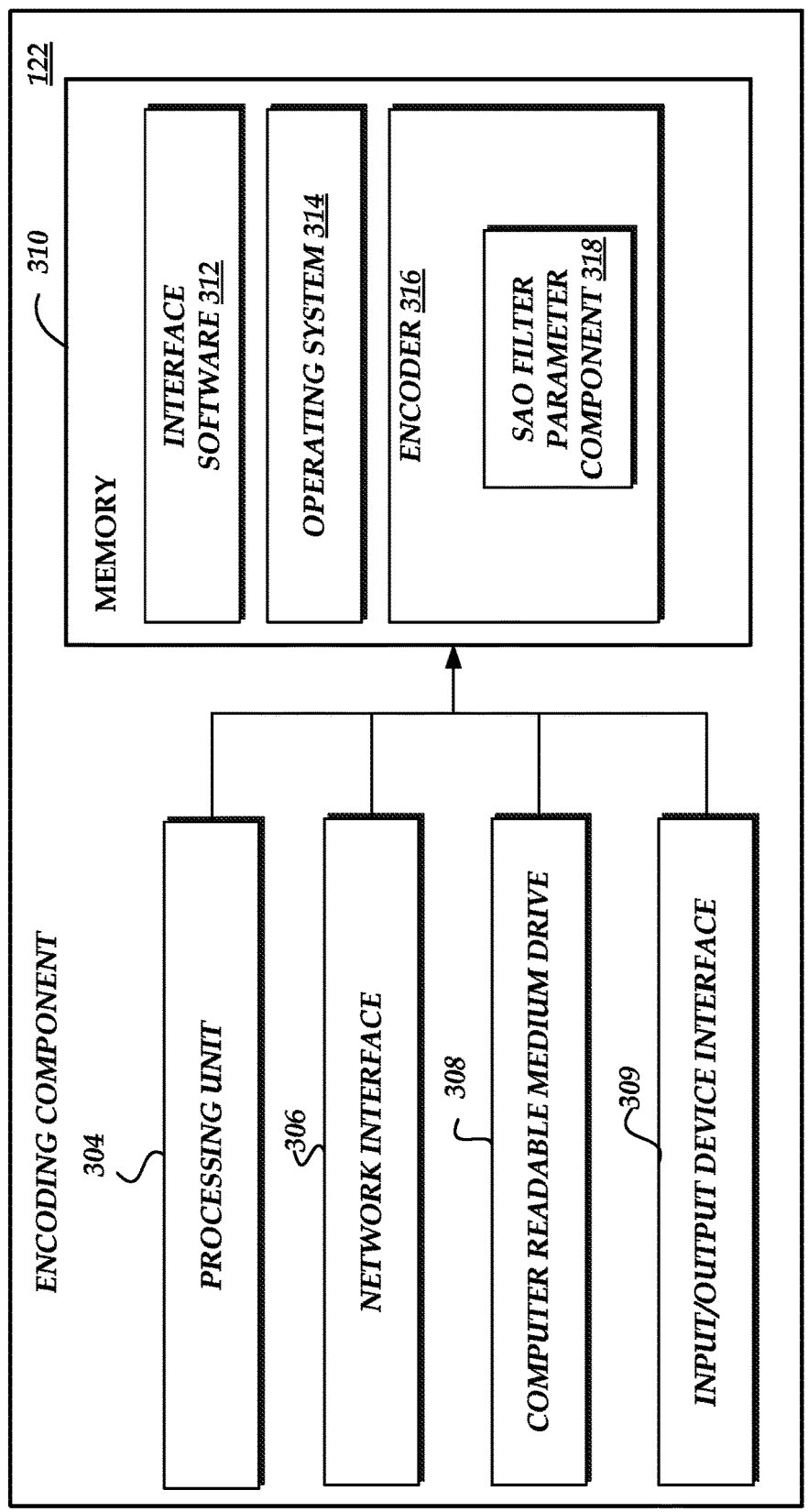
FIG. 3 is a block diagram of illustrative components of an encoder of a packaging and origination service configured to manage sample adaptive offset filter parameters for implementation in content encoding in accordance with some embodiments.

FIG. 3 depicts one embodiment of an architecture of an illustrative encoding component 122 for implementing the video packaging and origination service 120 described herein. The general architecture of the encoding component 122 depicted in FIG. 3 includes an arrangement of computer hardware and software components that may be used to implement aspects of the present disclosure. As illustrated, the encoding component 122 of the video packaging and origination service 120 includes a processing unit 304, a network interface 306, a computer readable medium drive 308, and an input/output device interface 309, all of which may communicate with one another by way of a communication bus. The components of the encoding component 122 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoding component 122 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving and processing content requests from user devices 102. Memory 310 includes an encoder 316 for encoding video segments to be sent to user devices 102 in response to content requests. As will be described in detail below, the encoder 316 includes a SAO filter parameter component 318 for selecting filter parameters for use in the SAO filter of the encoder 316.

Figure 4:
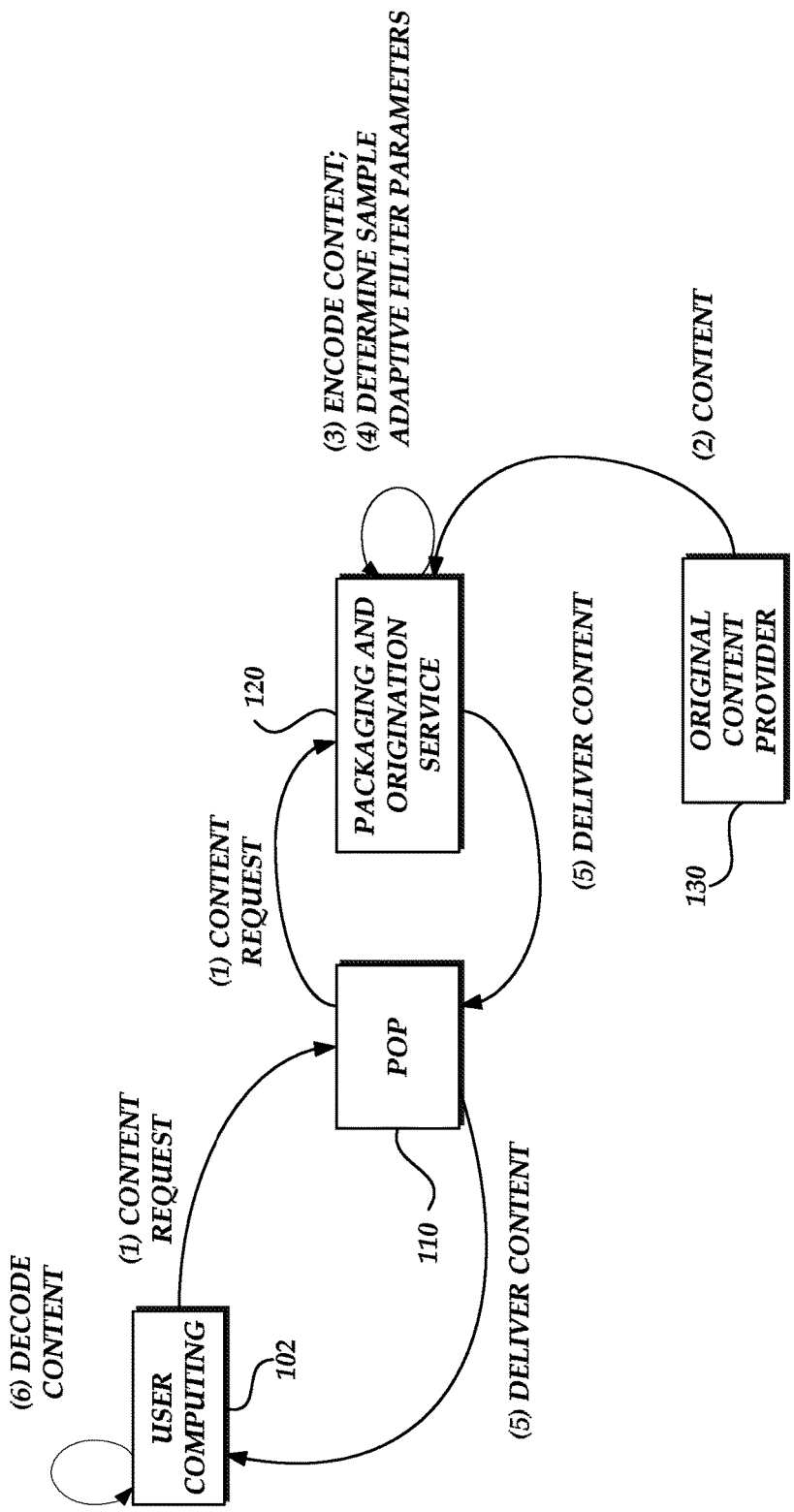
FIG. 4 is a block diagram of the content delivery environment of FIG. 1 illustrating the interaction related to user device for generating content requests and receiving encoded content in accordance with some embodiments.

Turning now to FIG. 4, an illustrative interaction for the processing of content requests will be described. At (1), the user device 102 transmits a request for content. Illustratively, a user can access one or more software applications on the user device to request content, such as streaming content. For example, the user device can generate an interface for receiving user commands or interactions and transmit the request. The initial content request may be transmitted directly to the video packaging and origination service 120 and then sent to a selected content delivery network POP 110. Alternatively, the initial content request may be routed, such as via DNS routing or HTTP-based routing, to a POP 110. For purposes of illustration, the receiving POP 110 may not have a copy of the requested file and may need to retrieve at least a portion of the requested content.

In response, at (2), the original content provider 130 provides the requested content to the video packaging and orientation service 120. The content can be transmitted in a number of ways from the original content provider 130 to the video packaging and orientation service 120. At the video packaging and orientation service 120, the content is processed and prepared for transmission to the user device 102. At (3), the video packaging and orientation service 120 encodes the content for transmission. The encoding process, in accordance with aspects of the present application, includes the selection of filter parameters for the SAO filter of the encoding component 122. At (4), the encoding component 122 determines the SAO filter parameters. In accordance with aspects of the present application, the encoding component 122 calculates the quantization parameter of the frame and selects the SAO filter parameter mode in response to the calculated quantization parameter. The encoding component 122 selects from a plurality of SAO filter parameter selection modes in response to the calculated quantization parameter. The SAO filter parameters are selected in response to the selected SAO filter parameter selection mode. The encoded content including the SAO filter parameters is delivered at (5).

Figure 5:
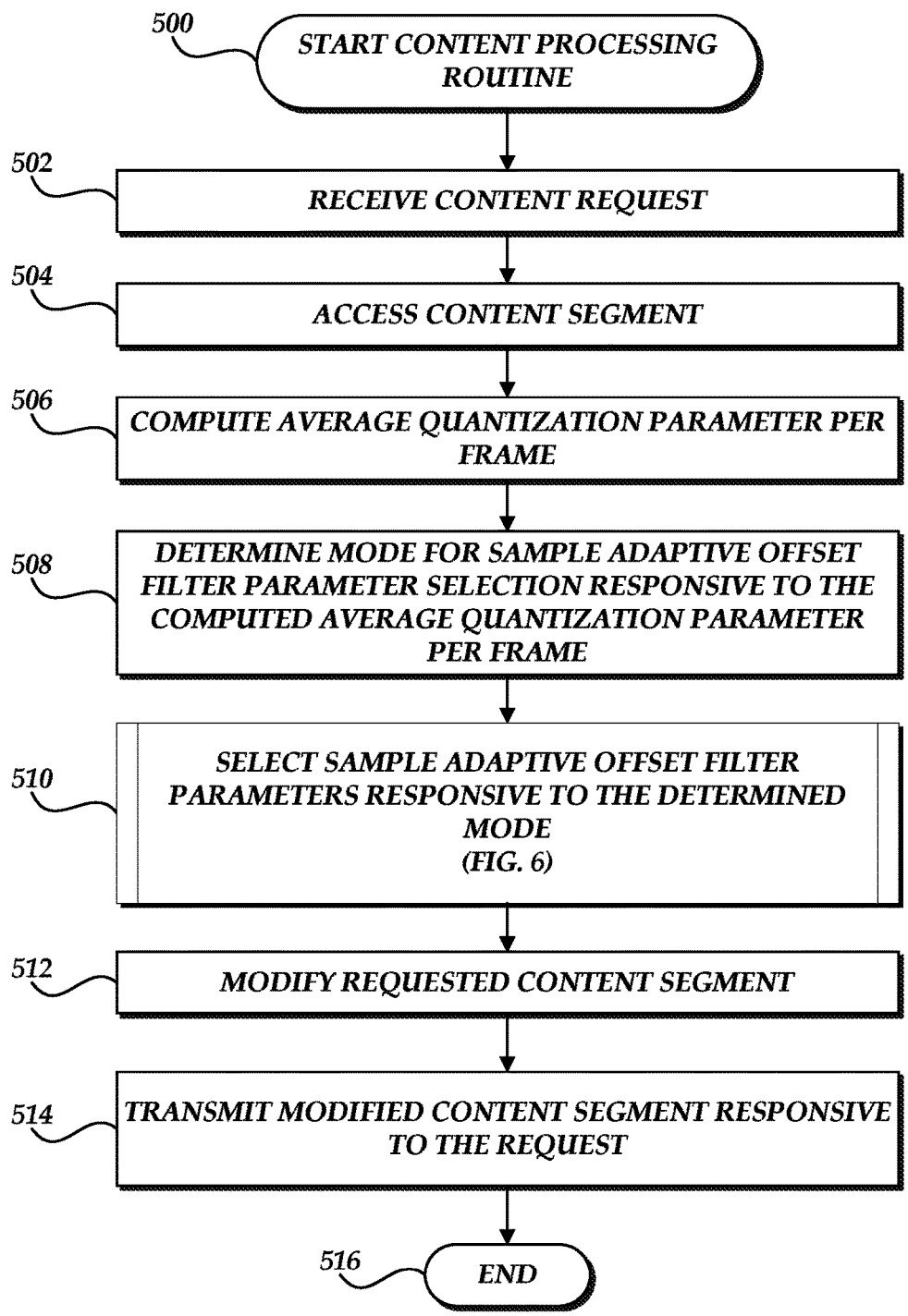
FIG. 5 is a flow diagram illustrative of a content processing routine implemented by a video packaging system in accordance with some embodiments.

Turning now to FIG. 5, a method or process 500 for processing content requests will be described. Illustratively, the routine 500 will be described with regard to implementation by the video packaging and origination service 120 or encoding component 122. At block 502, the video packaging and origination service 120 receives a request for content. The content may be stored at the video packaging and origination service 120 or the video packaging and origination service 120 may request the content from the original content provider 130. At block 504, the video packaging and origination service 120 accesses a segment of the content.

At block 506, the encoder 316 computes the average quantization parameter per frame for the content segment. At block 508, the encoder 316 determines the mode of the SAO filter parameter selection process responsive to the computed average quantization parameter per frame for the content segment. The mode of the SAO filter parameter selection process can determine how the SAO filter parameter component 318 determines the SAO filter parameters. In accordance with aspects of the present application, the encoder 316 uses the average quantization parameter per frame to determine different SAO filter selection modes. The average quantization parameter per frame provides an indication of the amount of spatial detail in the frame. In accordance with aspects of the present application, the computed average quantization parameter is compared to a threshold value representing an amount of spatial detail. The amount of spatial detail in the frame can provide an indication of how much SAO EO filtering, SAO BO filtering, a combination of SAO EO and SAO BO filtering, or a lack of SAO filtering can be applied to the frame to provide improved video quality. In accordance with aspects of the present application, there can be five parameter selection modes (as discussed below). In an embodiment, there can be more or less than five parameter selection modes.

Figure 6:
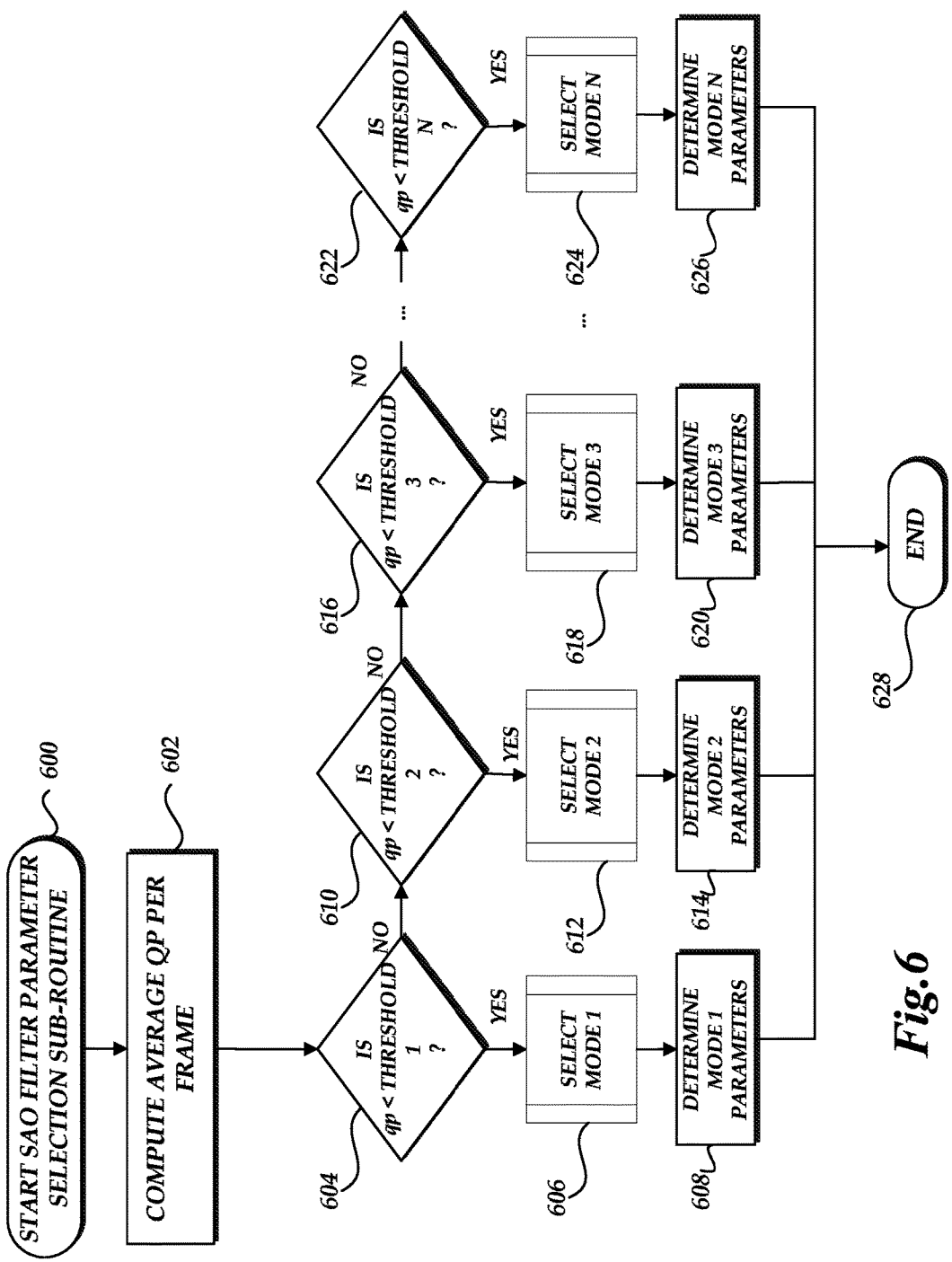
FIG. 6 is a flow diagram illustrative of a sample adaptive offset filter parameter selection routine implemented by a video packaging system in accordance with some embodiments.

At block 510, the SAO filter parameter component 318 of the encoder 316 selects the SAO filter parameters responsive to the determined mode, as will be further detailed in FIG. 6.

At block 512, the encoder 316 modifies the requested content segment. As an example, the encoder 316 includes the SAO filter parameters in the bitstream of the encoded content segment. At block 514, the video packaging and origination service 120 transmits the encoded content segment, including the SAO parameters in response to the content request.

Turning now to FIG. 6, a method or process 600 for selecting SAO filter parameters will be described, detailing the subroutine referenced in 510 in FIG. 5. Illustratively, routine 600 will be described with regard to implementation by the encoder 316 or the SAO filter parameter component 318 of the video packaging and origination service 120.

At block 602, the encoder 316 computes the average quantization parameter per frame for the segment. At block 604, the encoder 316 compares the computed quantization parameter to a first threshold. When the computed quantization parameter is less than the first threshold, the encoder 316 selects mode 1 at block 606. At block 608, the SAO filter component 318 determines the mode 1 filter parameters for the SAO filter of the encoding component 122.

When the computed quantization parameter is not less than the first threshold, the computed quantization parameter is compared to a second threshold. At block 610, the encoder 316 compares the computed quantization parameter to the second threshold, and if the computed quantization parameter is less than the second threshold, the routine proceeds to block 612 at mode 2. At block 614, the SAO filter component 318 determines the mode 2 filter parameters for the SAO filter of the encoding component 122.

When the computed quantization parameter is not less than the second threshold, the computed quantization parameter is compared to a third threshold. At block 616, the encoder 316 compares the computed quantization parameter to the third threshold, and if the computed quantization parameter is less than the third threshold, the routine proceeds to block 618 at mode 3. At block 620, the SAO filter component 318 determines the mode 3 filter parameters for the SAO filter of the encoding component 122.

When the computed quantization parameter is not less than the third threshold, the computed quantization parameter is compared to a next or $N^{th}$ threshold that is greater than the previous thresholds. At block 622, the encoder 316 compares the computed quantization parameter with the $N^{th}$ threshold, and if the computed quantization parameter is less than the $N^{th}$ threshold, the routine proceeds to block 624 at mode N. At block 626, the SAO filter component 318 determines the mode N filter parameters for the SAO filter of the encoding component 122.

As illustrated in FIG. 6, there can be N progressively greater thresholds and N filter parameter selection modes for determining the SAO parameters by the SAO filter component 318. Additional modes of SAO filter parameter selection can result in increased granularity for the SAO filter parameters, which in turn improve video quality.

By way of illustrative example, an embodiment with five modes for selecting SAO filter parameters will be described. After the encoder 316 computes the average quantization parameter per frame, the encoder 316 compares the computed quantization parameter to a first threshold. In an embodiment, the first threshold can be approximately 8. In some embodiments, the first threshold may be greater than or less than approximately 8. When the computed quantization parameter is less than the first threshold, the encoder 316 selects a first parameter selection mode. For example, in the first parameter selection mode, the SAO filter parameter component 318 disables the SAO filter to preserve the texture and details of the picture and does not select SAO filter parameters. When the computed quantization parameter is not less than the first threshold, the encoder 316 selects from additional parameter selection modes.

With continuing reference to the illustrative example, when the computed quantization parameter is not less than the first threshold, the encoder 316 compares the computed quantization parameter to a second threshold. In an embodiment, the second threshold can be approximately 16. In some embodiments, the second threshold may be greater than or less than approximately 16. When the computed quantization parameter is less than the second threshold, the encoder 316 selects a second parameter selection mode. For example, the second parameter selection mode can be a banding artifacts reduction mode. In the banding artifacts reduction mode, SAO filter parameters can be determined to reduce perceived banding artifacts, especially for higher gradient regions of the picture. For example, the SAO filter parameter component 318 disables the EO type of the SAO filter, finds the starting bands and performs a rate distortion optimization (RDO) process to find the optimum SAO filter parameters for the block. In addition, the SAO filter parameter component 318 may examine bands around the starting band and iteratively select the band to reduce banding artifacts using certain criteria. After determining the best band to reduce banding artifacts, the SAO filter parameter component 318 performs an RDO process to find the optimum SAO filter parameters for the block. When the computed quantization parameter is not less than the first and second thresholds, the encoder 316 selects from additional parameter selection modes.

With continuing reference to the illustrative example, when the computed quantization parameter is not less than the second threshold, the encoder 316 compares the computed quantization parameter to a third threshold. In an embodiment, the third threshold can be approximately 24. In some embodiments, the third threshold may be greater than or less than approximately 24. When the computed quantization parameter is less than the third threshold, the encoder 316 selects a third parameter selection mode. For example, the third parameter selection mode can be a ringing artifacts reduction mode. In the ringing artifacts reduction mode, the SAO filter parameter component 318 enables the SAO filter for ringing prone blocks to reduce ringing artifacts.

For example, the SAO filter parameter component 318 disables the BO type of the SAO filter and detects edges. In some embodiments, the SAO filter parameter component 318 uses a Sobel operator to detect the edges. For example, a block can be considered an edge when the number of edge pixels is greater than half of the block size and a pixel can be considered an edge when the Sobel gradient image resulting from the use of the Sobel operator is non-zero. After detecting an edge, the SAO filter parameter component 318 determines whether the edge is prone to ringing. For example, when the more than half of blocks in a coding unit are detected as an edge and a number of the blocks are flat or homogeneous, the edge can be prone to ringing. In some embodiments, the number of the blocks that are flat or homogeneous can be at least 25% of the blocks. In some embodiments, the number of the blocks that are flat or homogeneous can be less than 25% of the blocks. When the SAO filter parameter component 318 determines that an edge is not prone to ringing, the SAO filter parameter component 318 disables the EO type of the SAO filter. When the SAO filter parameter component 318 determines that an edge is prone to ringing, the SAO filter parameter component 318 performs an RDO process to find the optimum SAO filter parameters for the block. When the computed quantization parameter is not less than the first, second and third thresholds, the encoder 316 selects from additional parameter selection modes With continuing reference to the illustrative example, when the computed quantization parameter is not less than the third threshold, the encoder 316 compares the computer quantization parameter to a fourth threshold. In some embodiments, the fourth threshold can be approximately 32. In some embodiments, the fourth threshold may be greater than or less than approximately 32. When the computed quantization parameter is less than the fourth threshold, the encoder 316 selects a fourth parameter selection mode. For example, the fourth parameter selection mode can be block adaptive mode. The block adaptive mode can determine SAO filter parameters for preserving the texture and overall sharpness of the picture. For example, the SAO filter parameter component 318 enables the EO and BO types of the SAO filter and selects one of the EO and BO types or disables the SAO filter responsive to a sharpness measure on the reconstructed picture that includes the SAO filter offsets. In some embodiments, the SAO filter parameter component 318 performs an RDO process to determine the EO offsets and the BO offsets, reconstructs the block including the EO offsets, reconstructs the block including the BO offsets, reconstructs the block without offsets, and computes a measure of sharpness for the reconstructed blocks. The SAO filter parameter component 318 selects the offsets (EO or BO) or lack of offsets that provide the greater indication of sharpness.

For example, when the reconstructed block without offsets provides a greater indication of sharpness than the reconstructed block with the EO offsets and the reconstructed block with the BO offsets, the SAO filter parameter component 318 disables the SAO filter. When the reconstructed block with the EO offsets provides a greater indication of sharpness than the reconstructed block without the offsets and the reconstructed block with the BO offsets, the SAO filter parameter component 318 selects the EO offsets. When the reconstructed block with the BO offsets provides a greater indication of sharpness than the reconstructed block without the offsets and the reconstructed block with the EO offsets, the SAO filter parameter component 318 selects the BO offsets.

When the computed quantization parameter is not less than the first, second, third, or fourth thresholds, the encoder 316 selects from an additional parameter selection mode.

With continuing reference to the illustrative example, when the computed quantization parameter is not less than the fourth threshold, the encoder 316 selects a fifth parameter selection mode. For example, the fifth parameter selection mode can be a default mode in which the SAO filter parameter component 318 performs an RDO process to optimize the SAO filter parameters.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system that encodes content organized into a plurality of segments, the system comprising:
   one or more computing devices associated with a video packaging and origination service, wherein the video packaging and origination service is configured to:
   access content for a requested segment corresponding to a received request for streaming content;
   calculate an average quantization parameter per frame for the requested segment;
   select one of at least three sample adaptive offset filter operating modes based on the calculated quantization parameter per frame;
   determine sample adaptive offset filter parameters responsive to the selected mode;
   encode the content of the requested segment according to the determined sample adaptive offset filter parameters; and
   transmit the encoded content responsive to the received request for streaming content.

2. The system of claim 1 wherein selecting the one of the at least three sample adaptive filter offset operating modes responsive to the calculated quantization parameter per frame includes selecting a first adaptive operating mode corresponding to no adaptive filtering.

3. The system of claim 1 wherein selecting the one of the at least three sample adaptive filter offset operating modes responsive to the calculated quantization parameter per frame includes selecting a first adaptive filter operating mode corresponding to full adaptive filtering.

4. The system of claim 1 wherein selecting the one of the at least three sample adaptive filter offset operating modes responsive to the calculated quantization parameter per frame includes selecting a first adaptive filter operating mode corresponding to partial adaptive filtering.

5. A computer-implemented method to encode content for transmission to computing devices comprising:
   receiving a request for streaming content, the streaming content organized as a set of segments;
   determining a sample adaptive offset (SAO) filtering mode from at least three available SAO filtering modes in response to a calculated average quantization parameter per frame;
   encoding the requested content utilizing the determined SAO filtering mode; and
   causing a transmission of the encoded content.

6. The computer-implemented method of claim 5 wherein the at least three available SAO filtering modes includes at least five SAO filtering modes.

7. The computer-implemented method of claim 5 further comprising comparing the calculated average quantization parameter per frame to a threshold.

8. The computer-implemented method of claim 5 further comprising determining SAO filter parameters in response to the determined SAO filtering mode.

9. The computer-implemented method of claim 8 wherein the determined SAO filter parameters include offsets used in reconstruction of the encoded content.

10. The computer-implemented method of claim 5 further comprising selecting a first SAO filtering mode from the at least three available SAO filtering modes responsive to the calculated average quantization parameter per frame being less than a first threshold associated with the first SAO filtering mode.

11. The computer-implemented method of claim 5 further comprising determining the SAO filter type in response to the determined SAO filtering mode.

12. The computer-implemented method of claim 11 wherein the SAO filter type includes at least one of an Edge Offset (EO) type and a Band Offset (BO) type.

13. The computer-implemented method of claim 5 wherein one of the at least three available SAO filtering modes includes a block adaptive mode to preserve texture and sharpness of a reconstructed segment.

14. The computer-implemented method of claim 13 wherein encoding the requested content utilizing the block adaptive mode includes determining SAO filter parameters for an Edge Offset (EO) SAO filter type and a Band Offset (BO) SAO filter type.

15. The computer-implemented method of claim 14 wherein encoding the requested content utilizing the block adaptive mode further includes encoding the requested segment with EO SAO filter parameters associated with the EO SAO filter type to form a first encoded segment and encoding the requested segment with BO SAO filter parameters associated with the BO SAO filter type to form a second encoded segment.

16. The computer-implemented method of claim 15 wherein encoding the requested content utilizing the block adaptive mode further allows for reconstructing the first encoded segment and reconstructing the second encoded segment.

17. The computer-implemented method of claim 16 wherein encoding the requested content utilizing the block adaptive mode further includes selecting one of the EO SAO filter parameters, the BO SAO filter parameters, and no SAO filter parameters in response to a measure of sharpness of reconstructed segments.

18. A computer-implemented method to deliver content comprising:
   receiving a request for encoded content segments;
   selecting from a plurality of active sample adaptive offset filtering operational modes, wherein the selected operational mode is identified by average quantization parameter per frame information; and
   causing a transmission of the encoded content segments.

19. The computer-implemented method of claim 16 further comprising determining filter offsets in response to the selected operational mode.

20. The computer-implemented method of claim 16 wherein the transmission includes the filter offsets.

* * * * *